United States Patent [19]

Glynn

[11] Patent Number: 4,632,501

[45] Date of Patent: Dec. 30, 1986

[54] RESONANT ELECTROMECHANICAL OSCILLATOR

[75] Inventor: Paul E. Glynn, Braintree, Mass.

[73] Assignee: General Scanning, Inc., Watertown, Mass.

[21] Appl. No.: 580,657

[22] Filed: Feb. 16, 1984

[51] Int. Cl.$^4$ .............................................. G02B 26/10
[52] U.S. Cl. ...................................... 350/6.6; 324/80; 310/38
[58] Field of Search ................... 350/6.5, 6.6, 6.7, 6.8; 310/38, 39, 46; 324/80

[56] References Cited

U.S. PATENT DOCUMENTS

| | | | |
|---|---|---|---|
| 1,941,319 | 12/1933 | Pfaffenberger | 171/95 |
| 2,059,159 | 10/1936 | Whitaker et al. | 178/6 |
| 2,486,334 | 10/1949 | Slamar | 250/235 |
| 2,681,588 | 6/1954 | Dyner | 324/80 |
| 2,793,293 | 5/1957 | Ehrlinger et al. | 324/80 |
| 3,079,555 | 2/1963 | Daschke | 324/80 |
| 3,150,337 | 9/1964 | Allison | 333/71 |
| 3,532,408 | 10/1970 | Dostal | 350/6 |
| 3,609,485 | 9/1971 | Dostal | 318/132 |
| 3,671,766 | 6/1972 | Howe | 310/39 |
| 3,932,809 | 1/1976 | Frank | 324/96 |
| 3,959,673 | 5/1976 | Montagu | 310/38 |
| 4,302,720 | 11/1981 | Brill | 324/146 |

Primary Examiner—John K. Corbin
Assistant Examiner—Loha Ben

[57] ABSTRACT

A resonant electromechanical oscillator which includes a base portion, a driven portion, a cantilevered sheet-form flexural suspension which spaces the driven portion from the base portion for oscillation about an axis in the plane of the sheet-form suspension, and an electromagnetic drive which includes cooperating portions on the base and driven portions for oscillating the driven portion at a resonant frequency. The ends of the sheet-form suspension are coupled to the base and driven portions with at least one end coupling being adjustable to select the resonant frequency of the oscillator by changing the effective length of the sheet suspension. Fixed surfaces on the base portion limit angular excursion of the driven portion and limit buckling distortion of the sheet-form suspension. Preferred embodiments of the oscillator have a driven portion with a mass in the range of two to ten grams, and withstand impact loads of at least five hundred g's. In particular, a rugged resonant scanner, capable of use in a portable device is shown.

22 Claims, 9 Drawing Figures

RESONANT ELECTROMECHANICAL OSCILLATOR

This invention relates to resonant electromechanical oscillators of the type useful for scanning, sweeping, driving shutters or otherwise controlling a beam of radiant energy, such as a light beam.

Such resonant electromechanical oscillators have inherently low damping (energy loss) capabilities, a feature which gives them the capacity to execute large harmonic motions while requiring little driving force or torque as only the lost energy has to be restored in order to perpetuate the motion. Unfortunately, that feature makes such oscillators sensitive to excitation from external shocks and vibrations. Such electromechanical oscillators also are typically relatively difficult and expensive to manufacture. If these drawbacks were overcome, such oscillators would be increasingly useful, for instance in portable devices such as laser-type barcode scanning readers. Barcode readers are useful at portable terminals, cash registers, shop floor control systems and other locations where hand-held flexibility is desired. It is desirable that the barcode readers be inexpensive, sturdy assemblies that are capable of withstanding impact loads of several hundred g's.

The invention concerns a resonant electromechanical oscillator which includes a base portion, a driven portion, a cantilevered sheet-form, flexural suspension which spaces the driven portion from the base portion for oscillation about an axis in the plane of the sheet-form suspension, and an electromagnetic drive which includes cooperating portions on the base and driven portions for oscillating the driven portion at a resonant frequency. The oscillator has a soft and flexible suspension in one axis of rotation while exhibiting great stiffness in all other possible sensitive degrees of freedom. The invention also features the adjustability of at least one end coupling for the sheet-form suspension to select the resonant frequency of the oscillator by selecting the effective flexural length. The invention also features fixed surfaces on the base portion which limit angular excursion of the driven portion and buckling-type distortion of the sheet-form suspension.

In preferred embodiments, the oscillator withstands impact loads of at least five hundred g's, the driven portion has a mass in the range of two to ten grams, the adjustable coupling structure includes a guide channel into which the end portion of the sheet-form suspension extends, clamp structure is slidable along the channel for adjusting the effective length of the sheet-form suspension while maintaining a predetermined spacing between the base and driven portions, and means are provided for fixing the clamp structure in the guide channel in the selected position.

In particular embodiments, the driven portion is a scanner and carries a mirror; the sheet-form suspension is a spring metal member which has a uniform thickness dimension of less than 0.3 millimeter and has two parallel coplanar legs, and is secured to the driven portion by a bonding agent that has a Young's Modulus ten to fifty times less than that of the spring metal member (providing a low cost flexible blade without the necessity of enlarged anchors at both ends of the blade); and the base portion has two guide channel portions in which the legs of the flexible suspension are disposed and which receive clamping structure which is slidable along the channels to adjust the effective length of the sheet support. Engagement structure mounted on the guide channel fixes the clamp structure and simultaneously urges opposed clamp surfaces together to clamp the spring metal legs. The armature carries permanent magnet elements which are arranged to cooperate with drive and velocity coil elements mounted on the base portion. The coil supports include surfaces which limit the angular excursion of the driven portion, and limit surfaces upstanding from the base portion cooperate with the mirror support or armature to limit buckling-type distortion in the flexible sheet support.

Particular oscillators in accordance with the invention are stable, tunable high "Q" electromechanical resonant devices capable of being operated at a substantially constant frequency and having relatively low manufacturing costs and relatively wide part tolerances in systems which withstand impact loads of 1,000 g's or more.

Other features and advantages of the invention will be seen as the following description of particular embodiments progresses, in conjunction with the drawings, in which.

DESCRIPTION OF PARTICULAR EMBODIMENTS

Figure 1:
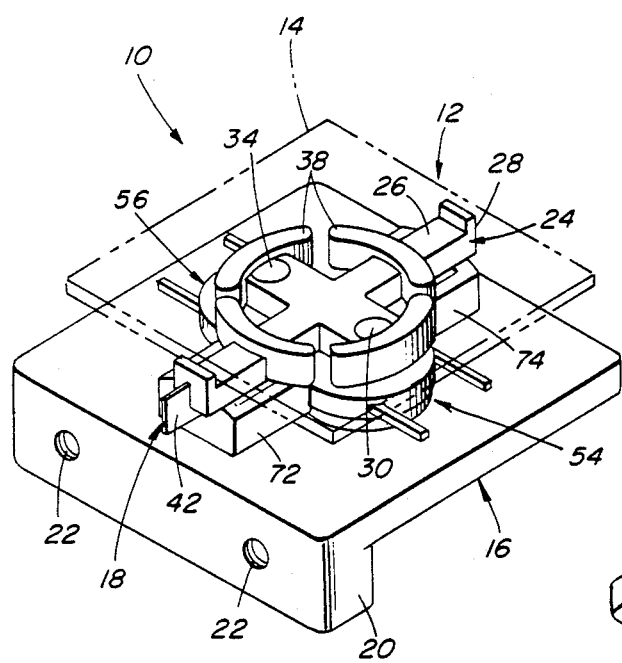
FIG. 1 is a perspective view of a resonant oscillator in accordance with the invention in the form of a scanner.
Figure 2:
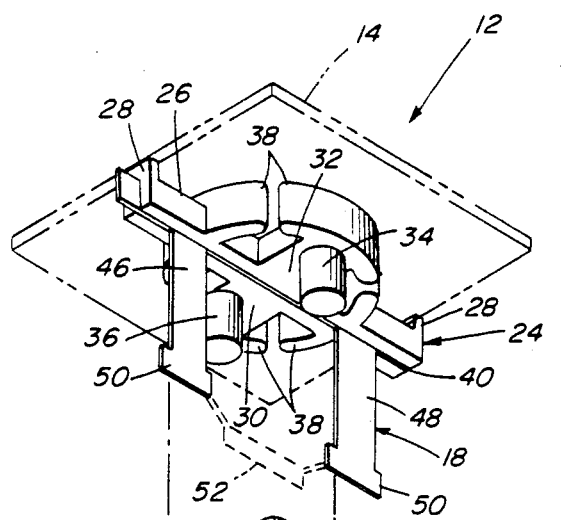
FIG. 2 is an exploded view of components of the scanner shown in FIG. 1.
Figure 2:
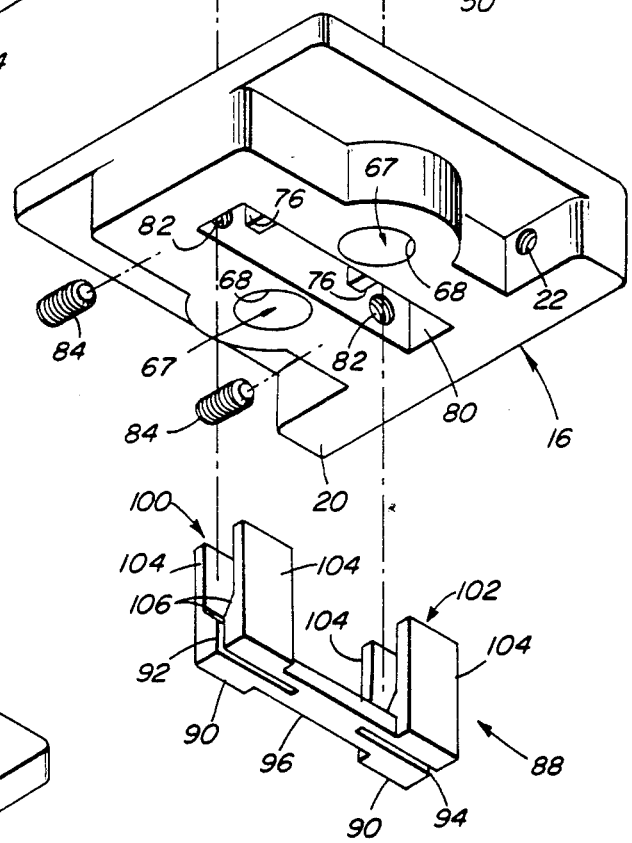

The resonant scanner 10, see e.g. FIGS. 1 and 2, includes a driven portion 12 which includes a planar mirror (about 2½ centimeter square and 0.1 centimeter thick) which is supported for oscillation above base 16 by a flexible sheet-form spring steel cantilever suspension 18. Base 16 is an aluminum investment casting about three centimeters square and has a thickness of about ¾ centimeter with a flange portion 20 and holes 22 for receiving mounting fasteners.

Driven portion 12 includes an aluminum investment casting mirror support 24 of cruciform configuration defined by a longitudinal central bar portion 26, with tips 28 against which the edges of mirror 14 are seated, and lateral arm portions 30, 32 from which depend (as may be seen with reference to FIGS. 2 and 7) magnet cylinders 34, 36 (about three millimeter diameter) of suitable material such as samarium cobalt or Alnico 8. Molded integrally with central bar 26 and side arms 30, 32 is a circular array of spaced arcuate mirror support portions 38 to which mirror 14 is secured with an RTV adhesive or other suitable securing material. Elongated slot 40, formed in the base of central bar 26 and extending throughout its length, has a width of about 0.15 millimeter and a depth of about 1.5 millimeters.

Sheet-form suspension member 18 is a sheet of carbon steel heat treated to a Rockwell C hardness in the range of 55–65 and formed by a mechanical process such as photoetching or laser burning. It has spine portion 42 and two spaced depending legs 46, 48, each of which has a length of about 1.1 centimeters and terminates in a base portion 50 of about ½ centimeter width. Legs 46, 48 are initially connected by a connecting portion 52 (indicated in dashed lines in FIG. 2) which maintains legs 46, 48 in alignment until spine 42 has been secured in slot 40, and is then sheared off.

Figure 3:
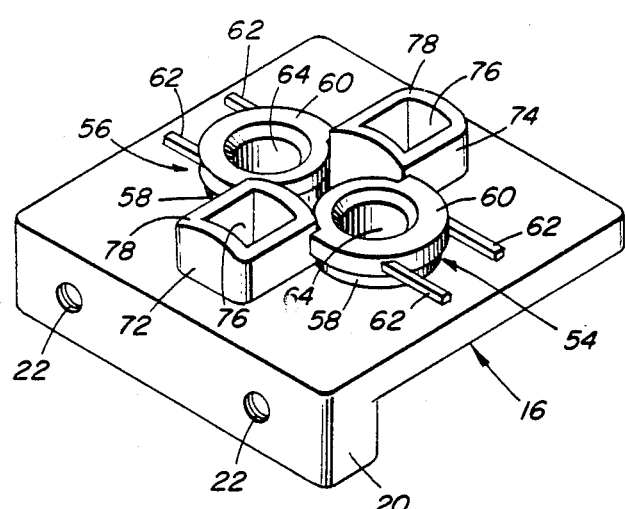
FIG. 3 is a perspective view of the base portion of the scanner shown in FIG. 1.
Figure 4:
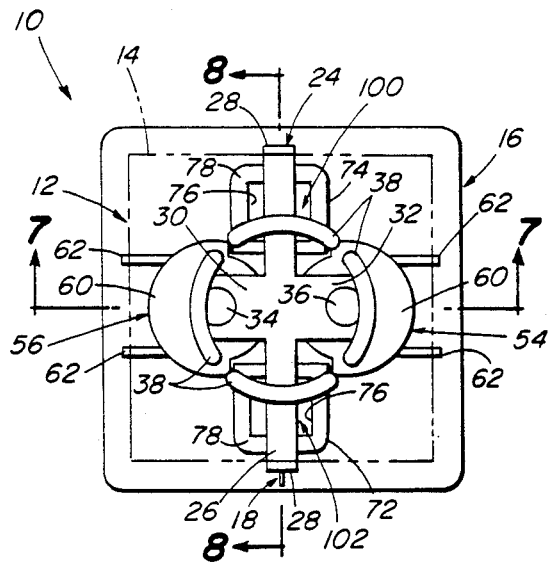
FIG. 4 is a top plan view of the scanner shown in FIG. 1.
Figure 7:
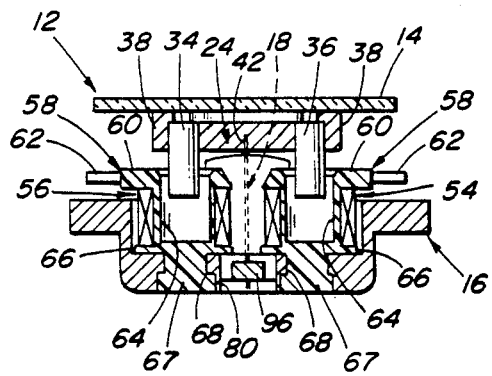
FIG. 7 is a sectional view taken along the line 7—7 of FIG. 4.

As best seen in FIGS. 3 and 7, mounted on base frame 16 is a drive coil assembly 54 and a velocity sensing coil assembly 56. Each coil assembly 54, 56 is wound on a nylon bobbin 58 which has a planar upper flange 60 from which coil lead supports 62 extend. Each bobbin defines a well 64 of about ½ centimeter diameter and about 0.6 centimeter depth. The lower flange 66 of each bobbin is seated in a recess in base 16 and has a post portion 67 which extends from the bottom of the nylon bobbin through counterbore 68 and is thermally expanded to firmly secure each coil—bobbin assembly on base 16.

Projecting upwardly from the surface of frame base 16 are two boss posts 72, 74, each of which defines a vertically extending through-channel 76 having a square cross section dimension of about ½ centimeter. The upper surfaces 78 of posts 72, 74 are aligned cylindrical surfaces with a radius of about 1.1 centimeters, formed about a horizontal axis in the plane of symmetry of the oscillator. The highest portion of these posts lies about 0.4 centimeter above the surface of base 16.

Figure 8:
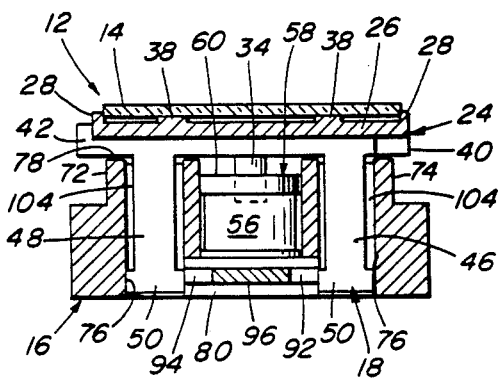
FIG. 8 is a sectional view taken along the line 8—8 of FIG. 4.

Rectangular opening 80, see FIGS. 2 and 8, is formed in the base of frame 16, and communicates with the channels 76. It has a width of about ½ centimeter and a length of about two centimeters. Threaded apertures 82 in the side wall that defines opening 80 receive set screws 84.

Clamp 88, see FIG. 2, has a rectangular base portion 90 (of dimensions corresponding to those of opening 80) with slots 92, 94 formed therein (each slot being about 0.15 millimeter wide and about 0.7 centimeter long) and with a central section 96 of reduced width. Extending upwardly above each slot is a guide post portion 100, 102 which has a length of about one centimeter, defined by two opposed arms 104. The inner surfaces of these guide arms are spaced apart about three millimeters, while each guide arm has a width of about ½ centimeter and a thickness of about one millimeter. An inclined transition surface 106 at the base of the inner surface of each guide arm 104 provides a lead-in surface into the slots 92, 94 in the base of the clamp 88, for aiding insertion of bases 50 of the flexural suspension member 18.

Figure 9:
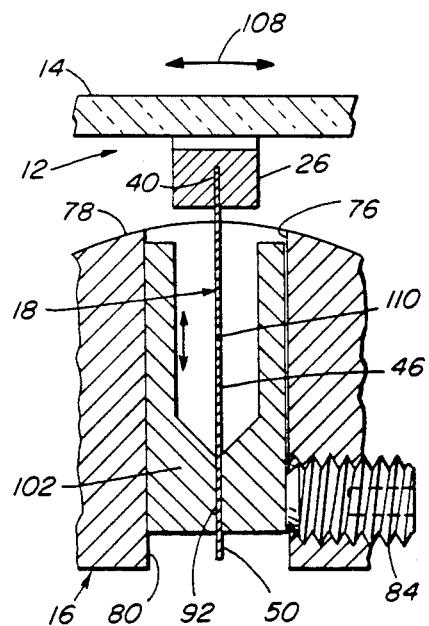
FIG. 9 is a diagrammatic view indicating aspects of the tuning capability of the scanner.
Figure 5:
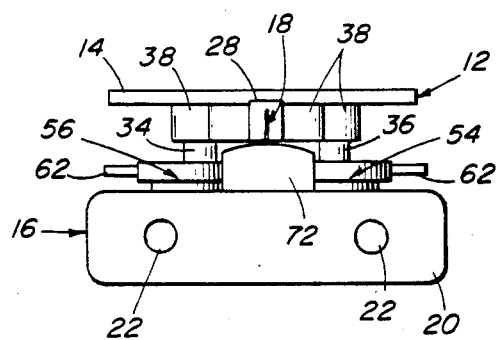
FIG. 5 is a front elevational view of the scanner.
Figure 6:
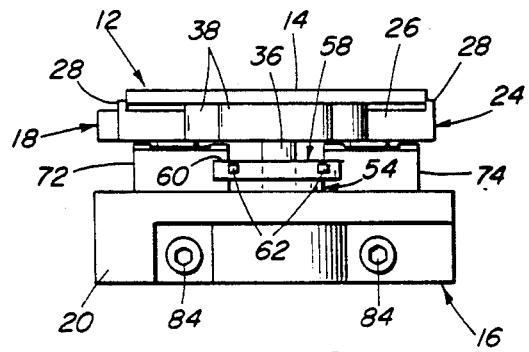
FIG. 6 is a side elevational view of the scanner.

During assembly, the driven portion subassembly, comprising mirror 14, mirror mount 24 and suspension 18, is interengaged with base portion 16 with the legs 46, 48 of suspension 18 inserted into channels 76, and with the lower surfaces of support arm 26 raised from the curved surfaces 78 of bosses 72, 74 by shims of about two millimeters thickness so that the driven subassembly is supported in fixed position with respect to frame base 16. Clamp 88 is inserted into opening 80 with its guide arms 104 extending upwardly into channels 76 so that the base portions 50 of spring legs 46, 48 enter slots 92, 94. As indicated in FIG. 9, clamp 88 has a range of sliding movement within channels 76 so that the effective lengths of the two flexible legs may be selected to obtain the desired resonant frequency. Clamp 88 is located in opening 80 and channels 76 and set screws 84 are tightened, simultaneously clamping the surfaces of slots 92, 94 against the lower ends 50 of spring legs 46, 48, and fixing the position of the clamp relative to base 16, thereby to fix the resonant length of the flexural system. If the system when tested is found to be out of tolerance, the resonant frequency can be adjusted by adjusting the position of clamp 88 in channels 76 (loosening set screws 84 to release the clamping force and moving the clamp 88 vertically in the channels 76) to vary the effective length of the flexure legs 46, 48.

The mass of the driven portion 12 mounted on flexible suspension sheet 18 is about six grams. In a twenty hertz resonant scanner of the type shown in FIGS. 1–8, each flexure leg 46, 48 has a width of about 0.4 centimeter, an effective length of about 0.8 centimeter, and a thickness of slightly less than 0.1 millimeter; while each flexure leg 46, 48 in a similar resonant scanner with a resonant frequency of 120 hertz has a width of about 0.4 centimeter, an effective length of about 0.8 centimeter, and a spring thickness of about 0.15 millimeter. The range of normal mechanical angular excursion 108 of these scanners is about plus or minus seven degrees about an effective axis 110 of rotation which is perpendicular to the plane of FIG. 9 and located substantially at the center of mass of the driven portion 12 (it being understood that sheet flexure legs 46, 48 do not bend only at a single well-defined point). The upper surfaces of bobbin flanges 60 provide stops that limit the mechanical angular excursion range of the system to plus or minus nine degrees. Boss stop surfaces 78 are effective to limit the buckling forces on the spring suspension 18. With the limits to motion of these stops the scanner 10 can withstand impact loads of one thousand g's or more. Other scanner configurations may be utilized, for example the array of supports 38 may support mirror 14 at an angle (for example twenty-three degrees) to the plane of bar 26.

While particular embodiments of the invention have been shown and described, various modifications will be apparent to those skilled in the art, and therefore it is not intended that the invention be limited to the disclosed embodiments or to details thereof and departures may be made therefrom within the spirit and scope of the invention.

What is claimed is:

1. A resonant electromechanical oscillator comprising
    a base portion,
    a driven portion,
    electromagnetic drive means including cooperating armature and coil portions on said base and driven portions,
    a cantilevered, sheet-form flexural suspension having first and second ends and supporting said driven portion at a position spaced from said base portion for oscillation about an axis in the plane of said sheet, and
    first coupling means coupling said first end of said sheet-form suspension to said base portion, and second coupling means coupling said second end of said sheet-form suspension to said driven portion, at least one of said coupling means being adjustable to select the effective length of said sheet-form suspension while maintaining a predetermined spacing between said base and driven portions.

2. The resonant oscillator of claim 1 wherein said one of said coupling means includes a guide channel in which a portion of said sheet-form suspension is disposed, clamp structure disposed in and slidable along said guide channel to a selected position, said clamp structure having opposed surfaces between which said sheet-form suspension is received, and securing means for fixing said clamp structure in said guide channel and for clamping said opposed surfaces of said clamp structure upon said sheet-form suspension to define a flexural cantilever length corresponding to a desired resonant frequency for said oscillator.

3. The oscillator of claim 2 wherein said securing means comprises an engagement device mounted upon said guide channel, adapted to engage said clamp structure to fix its position in said channel and simultaneously to urge said opposed surfaces together to clamp said sheet-form suspension.

4. The resonant oscillator of claim 1 and further including fixed surfaces on said base portion for limiting angular excursion of said driven portion.

5. The resonant oscillator of claim 1 or 4 and further including fixed surfaces on said base portion for limiting buckling-type distortion of said sheet-form suspension.

6. The resonant oscillator of claim 1 wherein said driven portion includes a mirror.

7. The resonant oscillator of claim 1 wherein said sheet-form suspension has a plurality of parallel, coplanar legs.

8. The resonant oscillator of claim 7 wherein said base portion has corresponding channel portions in which said legs of said sheet-form suspension are disposed and said adjustable coupling means includes clamping structure slidable along said channel portions to adjust the effective lengths of said legs.

9. The resonant oscillator of claim 1 wherein said electromagnetic drive means includes a permanent magnet element carried on said driven portion which is arranged to cooperate with a drive coil element mounted on said base portion.

10. The resonant oscillator of claim 9 and further including a velocity coil element mounted on said base portion.

11. The resonant oscillator of claim 10 wherein said coil elements include surfaces which limit the angular excursion of said driven portion.

12. The resonant oscillator of claim 11 and further including surfaces upstanding from said base portion that cooperate with said driven portion for limiting buckling-type distortion in said sheet-form suspension.

13. The resonant oscillator of claim 1 wherein said adjustable coupling means comprises an elongated holder defining spaced apart opposed generally planar surfaces between which one end of said sheet-form suspension is adapted to reside and means fixing a portion of said sheet-form suspension member with respect to said opposed surfaces at a selected position during manufacture, and wherein said adjustable coupling means and said base portion define cooperative guide means for enabling, during manufacture, slidable adjustment of said holder to a selection position relative to said base portion, in the selectable position of said holder with respect to said sheet-form suspension and to said base portion enabling selection of the flexural length of said sheet-form suspension while said driven portion at the other end of said sheet-form suspension maintains a fixed position with respect to said base portion.

14. The resonant oscillator of claim 13 wherein said sheet-form suspension includes a spring metal sheet that has a thickness dimension of less than about 0.3 millimeter, said driven portion has a mass of two to ten grams and includes a mirror, and further including fixed surfaces on said base portion for limiting angular excursion of said driven portion and for limiting buckling-type distortion of said sheet-form suspension so that said oscillator withstands impact loads of at least one thousand g's.

15. A resonant electromechanical oscillator comprising
a base portion, a driven portion, electromagnetic drive means including cooperating magnet and coil portions on said base and driven portions,
a sheet-form suspension supporting said driven portion spaced from said base portion for oscillation about an axis in the plane of said sheet,
adjustable means coupling said sheet-form suspension to said base and driven portions, and
fixed surfaces on said base portion for limiting angular excursion of said driven portion and for limiting buckling-type distortion of said sheet-form suspension so that said oscillator withstands impact loads of at least five hundred g's.

16. The resonant oscillator of claim 15 wherein said electromagnetic drive means includes a permanent magnet element carried on said driven portion which is arranged to cooperate with a drive coil element mounted on said base portion, and further including a velocity coil element mounted on said base portion, and said coil elements include said fixed surfaces which limit the angular excursion of said driven portion.

17. The resonant oscillator of claim 15 or 16 wherein said coupling means includes a guide channel in which a portion of said sheet-form suspension is disposed, clamp structure disposed in and slidable along said guide channel to a selected position, said clamp structure having opposed surfaces between which said sheet suspension is received, and securing means for fixing said clamp structure in said guide channel and for clamping said opposed surfaces of said clamp structure upon said sheet-form suspension to define a flexural cantilever length corresponding to a desired resonant frequency for said oscillator, said guide channel including a fixed surface upstanding from said base portion which defines said fixed surface for limiting buckling-type distortion in said sheet-form suspension.

18. In a resonant scanner comprising a base, an armature which includes beam scanning means, a sheet-form flexure suspension secured to said base and extending in cantilever form therefrom and supporting said armature spaced from said base, and electromagnetic drive means having interrelated parts disposed on said armature and said base, the improvement for enabling selection of a desired resonant frequency of said scanner comprising adjustable elongated clamp structure engaged along one edge of said sheet form flexure suspension at a selected position of said flexure suspension between said clamp structure and said armature, and means to secure said clamp structure with respect to said base.

19. The resonant device of claim 1, 15 or 18 wherein said sheet-form suspension is a spring metal member which has a uniform thickness dimension of less than 0.3 millimeter.

20. The resonant device of claim 19 wherein said spring metal member is secured to said driven portion by a bonding agent that has a Young's Modulus that is ten to fifty times less than that of said spring metal member.

21. The resonant scanner of claim 18 wherein said clamp structure comprises an elongated holder defining spaced apart, opposed generally planar surfaces defined by parallel legs joined integrally by a center portion, said sheet form flexure suspension adapted to reside between said surfaces and means arranged to deflect one of said surfaces to fix said flexure suspension at said selected position.

22. The resonant scanner of claim 21 wherein said clamp structure and said base define cooperative guide means for enabling slidable adjustment during manufacture of the position of said clamp structure relative to said base, in the cantilever direction of said flexure suspension, thereby enabling selection of the position of said clamp structure along said flexure suspension while said armature maintains a fixed position with respect to said base.

* * * * *